United States Patent [19]
Cross et al.

[11] 3,748,924
[45] July 31, 1973

[54] HYDROSTATIC TRANSMISSION AND METHOD OF TRANSMITTING POWER THERETHROUGH

[75] Inventors: Norman A. Cross, James C. Polak, both of Indianapolis, Ind.

[73] Assignee: General Motors Corporation, Detroit, Mich.

[22] Filed: Apr. 10, 1972

[21] Appl. No.: 242,309

[52] U.S. Cl. .................................. 74/677, 74/687
[51] Int. Cl. .................................. F16h 47/04
[58] Field of Search .................. 74/677, 687, 732, 74/733

[56] References Cited
UNITED STATES PATENTS

| | | | |
|---|---|---|---|
| 1,882,222 | 10/1932 | Lewis | 74/732 X |
| 3,302,487 | 2/1967 | Kempson | 74/687 X |
| 3,442,153 | 5/1969 | Ross | 74/687 |
| 3,538,790 | 11/1970 | Polak | 74/687 X |

FOREIGN PATENTS OR APPLICATIONS

| | | | |
|---|---|---|---|
| 1,918,954 | 10/1970 | Germany | 74/687 |
| 427,956 | 5/1935 | Great Britain | 74/677 |

*Primary Examiner*—Charles J. Myhre
*Assistant Examiner*—Thomas C. Perry
*Attorney*—W. E. Finken and D. F. Scherer

[57] ABSTRACT

A hydrostatic transmission having a variable displacement hydraulic pump in fluid communication with a pair of variable displacement hydraulic motors. The output shafts of the hydraulic motors are drivingly connected respectively to two members of a simple planetary gear set, the third member of which gear set is drivingly connected to the transmission output. One motor shaft and the planetary gear member connected thereto are operatively connected to a brake which is selectively operable to prevent rotation thereof. The brake is engaged in a low speed range to provide a gear reduction between the other motor output shaft and the transmission output through the planetary gear set. The brake is disengaged during a high speed range so that the one motor provides a rotating reaction for the planetary gear set and contributes a speed component to the planetary gear set.

6 Claims, 1 Drawing Figure

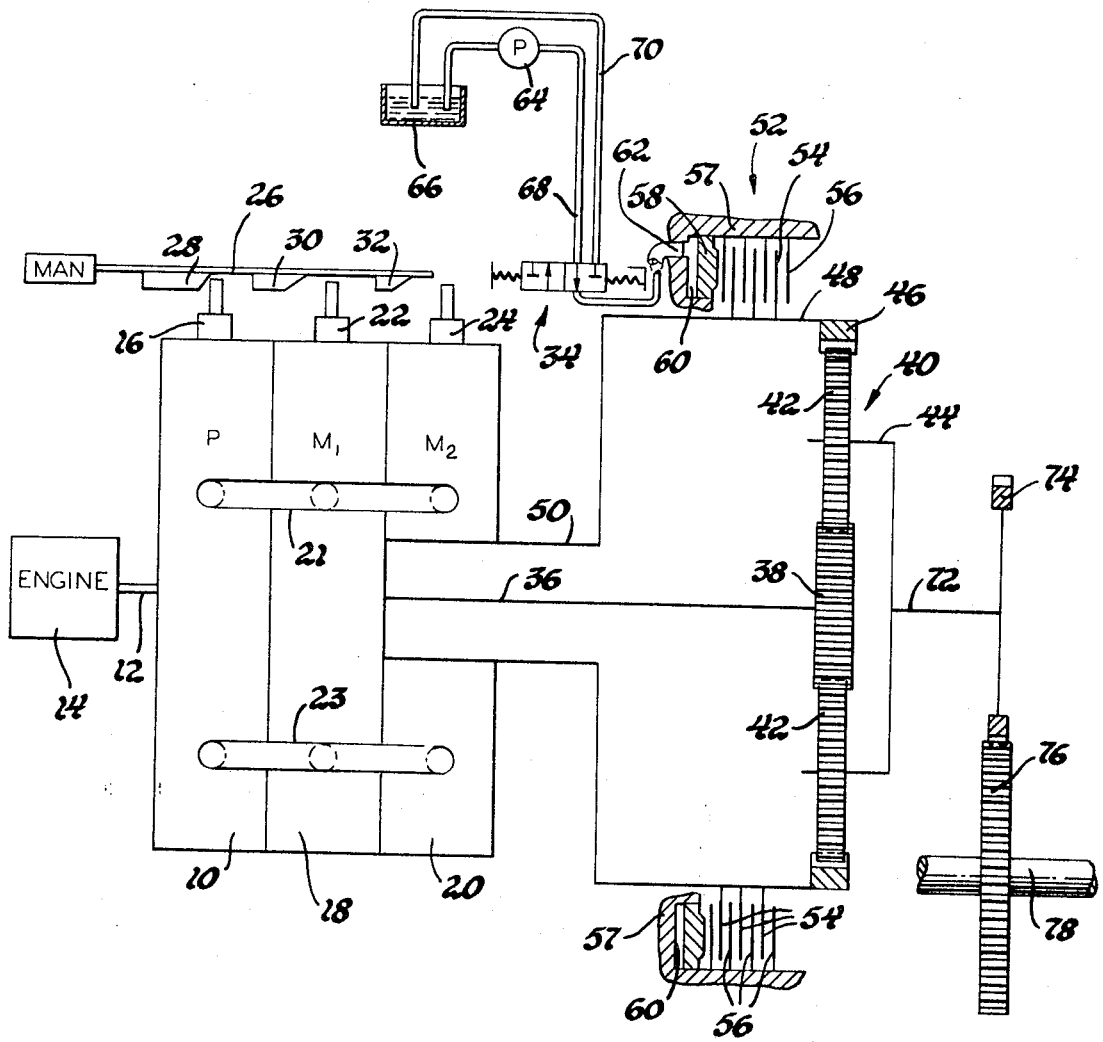

HYDROSTATIC TRANSMISSION AND METHOD OF TRANSMITTING POWER THERETHROUGH

This invention is related to hydrostatic transmissions and more particularly to hydrostatic transmissions utilizing at least two hydraulic motors, the outputs of which are drivingly connected to a planetary gear set.

Prior art transmissions using two or more fluid motors provide multiple speed ranges by successively reducing the displacement of and then disconnecting one or more fluid motors from the fluid source thus permitting the remaining motor or motors to be driven at increased speeds between fluid source to provide increased output speeds.

The present invention prevents driving of one of the motors by the fluid source during the low speed range by engaging a brake operatively connected to the output shaft of the reaction motor. This brake is also connected to a member of a planetary gear set to establish a reaction member therein to provide a reduction drive between the other motor output shaft and the transmission output. To increase transmission speed in the low range the pump displacement is increased from zero to a maximum value after which the displacement of the other motor is decreased to a predetermined value to provide a ratio with the displacement of the reaction motor equal to the gear ratio between the respective members of the planetary gear set connected to the output shafts of the motors. When this displacement is reached in the other motor, the torque components in the motors have a ratio equal to the ratio in the planetary gear set so that the brake can be released and the reaction motor provides the reaction for the planetary gear set. With the brake released the transmission is in the second or high speed range. To increase transmission speed in the second speed range the displacements of both motors are reduced simultaneously while maintaining the displacement ratio which was established at the upper end of the low speed range. During the second speed range the speed of the other motor will remain constant while the speed of the reaction motor will increase as the displacements are reduced. The increase in the speed of the reaction motor is combined in the planetary gear set with the speed of the other motor to provide an increase in transmission output speed. The torque components of the reaction motor is equal to the reaction torque required in the planetary gearing so that the reaction motor is a rotating reaction member for the planetary gearing while providing a speed component thereto.

It is an object of this invention to provide an improved hydrostatic transmission having variable displacement pump means for supplying fluid to a plurality of variable displacement motor means having the output shafts thereof drivingly connected to members of a planetary gear set the output member of which is drivingly connected to the transmission output, and a selectively operable brake to hold one motor and one member of the gear sets stationary during one speed range of operation and to release the motor and planetary gearing member during another speed range of operation.

It is another object of this invention to provide in an improved hydrostatic transmission variable displacement pump means operatively connected with a pair of variable displacement motor means one of which is held stationary during a first speed range of operation and is driven by the pump means during a second speed range of operation to provide a rotating reaction member in the transmission.

It is another object of this invention to provide an improved method for controlling a hydrostatic transmission having a variable displacement fluid pump operatively connected to a pair of variable displacement fluid motors which are drivingly connected to a planetary gear set by controlling one motor to provide a stationary reaction member in the planetary gear set while increasing the displacement of the pump and decreasing the displacement of the other motor in a low speed range of operation and permitting the one motor to rotate while decreasing the displacements of both motors simultaneously to maintain a fixed ratio between the motor displacements during a second speed range of operation.

These and other objects and advantages will be more apparent from the following description and drawing which is a schematic representation of a hydrostatic transmission embodying the invention.

Referring to the drawing there is shown a variable displacement pump 10 having an input shaft 12 driven by a conventional engine 14. The pump 10 may be a conventional variable displacement hydraulic pump or similar in construction to that shown in U.S. Pat. No. 3,274,946 issued to E. E. Simmons Sept. 27, 1966. A conventional servo mechanism 16 is provided to control the displacement of the pump 10. The displacement of the pump 10 can also be controlled in the manner described in the above mentioned patent should it be desirable to utilize that type of pump construction.

The pump 10 is in fluid communication with a pair of fluid motors 18 and 20 through fluid conduits 21 and 23. Each of the motors 18 and 20 are of the variable displacement type and may be of any conventional design or may be constructed in accordance with the structure shown in the above mentioned patent to Simmons. Conventional servo controls 22 and 24 are used to control the displacements of motors 18 and 20 respectively. The displacements of these motors may also be controlled in a manner similar to that discussed in the aforementioned Simmons patent. The servo controls 16, 22 and 24 are controlled by a linkage 26 having thereon a plurality of cams 28, 30 and 32 adapted to engage the servos 16, 22 and 24 respectively. The linkage 26 may be manually operated or hydraulically operated in a manner similar to the ratio actuator described in U.S. Pat. No. 3,592,281 issued to Utter and Christenson on July 13, 1971. The cams 28, 30 and 32 are designed such that during initial movement of the linkage 26 the servo control 16 is operated to cause the displacement of the pump 10 to be controlled between zero and a maximum value. When the pump 10 is at a maximum value the cam 30 will engage the servo control 22 to provide for a decrease in the displacement of the motor 18 upon further movement of the linkage. When a predetermined displacement is achieved in motor 18, as will hereinafter be explained, the cam 32 engages the servo control 24 to cause a decrease in the displacement in motor 20 such that further movement of the linkage 26 will cause simultaneous decrease in the displacement of both motors 18 and 20. The linkage 26 is also designed such that a conventional three way valve 34 will be engaged by the linkage 26 so that it will be shifted from the position shown to a second operating position which will hereinafter be explained.

The motor 18 has an output shaft 36 drivingly connected to a sun gear 38 which is a component in a simple planetary gearing generally designated 40. The sun gear 38 meshes with a plurality of planet pinions 42 rotatably mounted on a planet carrier 44. The planet gears 42 mesh with a ring gear 46 which is drivingly connected to a hub 48 which is also drivingly connected to an output shaft 50 of the motor 20. The hub 48 is also operatively connected with a selectively operable fluid operated brake generally designated 52. The brake 52 includes a plurality of friction plates 54 and 56 drivingly connected to the hub 48 in a stationary housing component 57 respectively. A fluid operated piston 58 is slidably disposed in an annular chamber 60 formed in the housing 57. The chamber 60 is in fluid communication with a passage 62 which is connected with the two way valve 34. The two way valve 34 is also in fluid communication with a fluid pump 64 and a fluid reservoir 66 via passages 68 and 70 respectively. In the position shown the passage 62 is in fluid communication with a pump 64 through the valve 34 such that fluid pressure is present in the chamber 60 and the brake 52 is engaged. When the linkage 26 engages the valve 34 the valve will be moved to its second position wherein the passage 62 is in fluid communication with the reservoir 64 via passage 70 thereby disengaging the brake 52. When the brake 52 is engaged the output shaft of motor 20 and the ring gear 46 are held stationary so that a reduction drive is established in the planetary gear set 40 whereby the carrier 44 will be driven in the same direction as the output shaft 36 of motor 18 at a reduced speed.

The planet carrier 44 is drivingly connected to a shaft 72 on which is secured a spur gear 74 which meshes with another spur gear 76 which is secured to the transmission output shaft 78. The output shaft 78 may be drivingly connected to the final drive trains of a conventional track vehicle thus providing a dual output transmission. If a single output transmission is desired, a sahft 72 can be connected to the final drive of the vehicle and the spur gears 74 and 76 can be eliminated.

OPERATION

With the engine 14 running, preferably at a governed speed, and the pump 10 at zero displacement the transmission will be in neutral. At this time the brake 52 can be either engaged or disengaged since there is no drive to the gear set at this time. To establish the low speed range the brake 52 is engaged and the displacement of pump 10 is increased from zero. As the displacement of pump 10 increases, the motor 18 will be driven by the fluid delivered by the pump 10 thereby driving the sun gear 38. The carrier 44 and the output shaft 78 will be driven at a speed less than the speed of sun gear 38 due to the speed reduction established in the planetary gear 40 by the brake 52.

The displacement of the pump 10 is increased to increase the speed of output shaft 78 until the maximum displacement is reached. With the pump at full displacement the displacement of motor 18 is decreased thereby further increasing the speed of the output shaft 78. When the displacement of the motor 18 has a rtaio with the displacement of the motor 20 equal to the ratio of the number of teeth of sun gear 38 to ring gear 46 the transmission will be at the upper end of the low speed range. When this point is reached the brake 52 can be disengaged and the motor 20 will provide sufficient reaction to maintain the ring gear 46 stationary.

When the brake 52 is disengaged the transmission will be in the second speed range. In this speed range to increase the output speed of the transmission the displacements of motors 18 and 20 are reduced simultaneously and in such a manner as to maintain the ratio of their displacements equal to that ratio in the upper end of the low speed range. As the displacements of motors 18 and 20 are decreased the speed of motor 18 will remain constant while the speed of motor 20 will increase thereby causing the speed of the carrier 44 to increase. By maintaining the above mentioned ratio between the displacements of the motors 18 and 20 the motor 20 will provide a rotation reaction member for the planetary gear set 40. Thus, during the second speed range the torque component to the output shaft 78 is supplied by the motor 18 and the speed component to the output shaft 78 is provided by both motors 18 and 20.

The following chart provides typical dimensions for a transmission embodying the present invention.

| | $N_p$ | $D_p$ | $P_p$ | GPM P | $NM_1$ | $DM_1$ | $PM_1$ | GPM $M_1$ | $NM_2$ | $DM_2$ | $PM_2$ | GPM $M_2$ | Brake Engage | $N_c$ | $T_c$ |
|---|---|---|---|---|---|---|---|---|---|---|---|---|---|---|---|
| 1st RANGE | 2100 | 0 | 4800 | 0 | 0 | 30 | 4800 | 0 | 0 | 30 | 0 | 0 | Yes | 0 | 5730 |
| | | 30 | 2500 | 272 | 2100 | 30 | 2500 | 272 | 0 | 30 | 0 | 0 | Yes | 700 | 3000 |
| | | 30 | | | 4200 | 15 | 2500 | 272 | 0 | 30 | 0 | 0 | Yes | 1400 | 1500 |
| 2nd RANGE | | 30 | | | | 10 | 2500 | 182 | 1050 | 20 | 2500 | 90 | No | 2100 | 1000 |
| | | 30 | | | | 7.5 | 2500 | 136 | 2100 | 15 | 2500 | 136 | | 2800 | 750 |
| | | 30 | | | | 6 | 2500 | 109 | 3150 | 12 | 2500 | 163 | | 3500 | 600 |
| | | 30 | | | | 5 | 2500 | 91 | 4200 | 10 | 2500 | 181 | | 4200 | 500 |

N = Speed–RPM
D = Displacement–cu. in.
P = Pressure–psi
T = Torque

Subscripts
P = Pump
M = Motor
C = Carrier

Ring Gear 46–60 Teeth
Sun Gear 38–30 Teeth

As can be seen from the above chart the ratio of the number of teeth on sun gear 38 to the number of teeth on ring gear 46 is 1:2. Thus, during the first speed range the motor displacement is decreased from 30 cu. in. to 15 cu. in. so that at the upper end of the first speed range the ratio of displacement of motor 18 to motor 20 is 1:2. During the second speed range the displacements of motors 18 and 20 are decreased from 15 and 30 cu. in. to 5 and 10 cu. in. respectively so that the 1:2 ratio is maintained. In the above chart the maximum displacement of the pump 10 is 30 cut. in. and the overall or total minimum motor displacement is 15 cu. in., therefore, the speed ratio between the input shaft 12 and the output shaft 72 will be 1:2 at the upper end of the second speed range.

To provide a change in direction, i.e., forward to reverse, of the output shaft 78, a conventional four way directional valve can be added to the fluid conduits 21 and 23 to reverse the flow from pump 10 to motors 18 and 20. Reverse operation can also be provided by using an over-center type pump for the pump 10. With an over-center type pump the pump is displaced on one side of center, or neutral, to deliver fluid to conduit 21 and the other side of center to deliver fluid to conduit 23.

Obviously, many modifications and variations of the present invention are possible in light of the above teachings. It is, therefore, to be understood that within the scope of the appended claims the invention may be practiced otherwise than as specifically described.

What is claimed is:

1. A hydrostatic transmission comprising, input means; output means; variable displacement hydraulic pump means drivingly connected with said input means and including means for controlling the displacement thereof; first variable displacement hydraulic motor means in fluid communication with said pump means and including means for controlling the displacement thereof; second variable displacement hydraulic motor means in fluid communication with said pump means and including means for controlling the displacement thereof; gearing means having a first member drive connected with said first motor means, a second member drive connected with said second motor means, and a third member drive connected with said output means; and selectively operable friction brake means operatively connected with said second member to hold said second member and said second motor means stationary for providing a gear reduction drive between said first motor means and said output means in a first speed range while said pump displacement is varied from zero to maximum and the displacement of said first motor means is reduced from maximum to a predetermined value to increase the speed of the output means, and for releasing said second gear member and said second motor means during a second speed range wherein both motor means are proportionately reduced in displacement to increase the speed of the output means.

2. A hydrostatic transmission comprising, input means; output means; variable displacement fluid pump means drivingly connected with said input means; first and second variable displacement fluid motor means in fluid communication with said pump means and each having an output member; planetary gearing means operatively connected between and providing a ratio between said output members, and including a member drivingly connected with said output means; selectively operable brake means operatively connected with said output member of said second pump means; and control means operatively connected with said pump means both said motor means and said brake means for controlling the displacement of said pump means from zero to a maximum value, controlling the displacement of said first motor means from a maximum value to a predetermined value having a displacement ratio with said second motor means equal to ratio in said planetary gearing means after said pump means is at the maximum value, controlling both the displacements of said motor means at a rate maintaining the displacements thereof at a ratio equal to the ratio in said planetary gearing means after said motor means displacement is at the predetermined value, and engaging said brake means while the displacements of said pump means and said first motor means are varied and disengaging said brake means when the displacements of both said motor means are varied.

3. A hydrostatic transmission comprising, input means; output means; variable displacement hydraulic pump means drivingly connected with said input means and including means for controlling the displacement thereof; first variable displacement hydraulic motor means in fluid communication with said pump means and including means for controlling the displacement thereof; second variable displacement hydraulic motor means in fluid communication with said pump means and including means for controlling the displacement thereof; simple planetary gearing means having a sun gear drive connected with said first motor means, a ring gear drive connected with said second motor means, and a planet carrier member drive connected with said output means; and selectively operable friction brake means operatively connected with said ring gear to hold said ring gear and said second motor means stationary for providing a gear reduction drive between said first motor means and said output means in a first speed range while said pump displacement is varied from zero to maximum and the displacement of said first motor means is reduced from maximum to a predetermined value to increase the speed of the output means, and for releasing said ring gear and said second motor means during a second speed range wherein both motor means are proportionately reduced in displacement to increase the speed of the output means.

4. A hydrostatic transmission comprising, input means; output means; variable displacement fluid pump means drivingly connected with said input means; first and second variable displacement fluid motor means in fluid communication with said pump means and each having an output member; planetary gearing means having a sun gear, ring gear and planet gears operatively connected between and providing a ratio between said output members, and a planet carrier member rotatably mounting said planet gears and being drivingly connected with said output means; first, second and third displacement control means for selectively controlling the displacements of said pump means, said first motor means and said second motor means respectively; selectively operable brake means operatively connected with said ring gear and said output member of said second pump means; and control means operatively connected with said displacement control means and said brake means for varying the displacement of said pump means from zero to a maximum value, decreasing the displacement of said first motor means from a maximum value to a predetermined value having a displacement ratio with said second motor means equal to ratio of said sun and ring gears in said planetary gearing means after said pump means is at the maximum value, decreasing both the displacements of said motor means at a rate maintaining the displacements thereof at a ratio equal to the ratio of said sun and ring gears in said planetary gearing means after said motor means displacement is at the predetermined value, and engaging said brake means while the displacements of said pump means and said first motor means are varied and disengaging said brake means when the displacements of both said motor means are varied.

5. A method of transmitting power in a hydrostatic transmission having variable displacement pump means in fluid communication with a pair of variable displacement motor means the output shafts of which are each respectively connected to a member of a planetary gear set the third member of which gear set is connected to the transmission output shaft, and a brake for controlling one member of the planetary gear set and one of the motor output shafts, comprising the steps of:
   a. engaging the brake to establish a gear reduction between one motor output shaft and the transmission output shaft and to hold the other motor stationary;
   b. increase the displacement of the pump from zero to maximum thereby driving the one motor;
   c. decreasing the displacement of the one motor from maximum until the displacement ratio of the motors is equal to the gear ratio between the planetary gear members connected to their output shafts;
   d. releasing the brake and thereby the other motor shaft; and
   e. decreasing the displacement of both motors simultaneously while maintaining the ratio of the displacements as established in step (c) until a predetermined minimum displacement is established in the one motor.

6. A method of transmitting power in a hydrostatic transmission having variable displacement pump means in fluid communication with a pair of variable displacement motor means the output shafts of which are each respectively connected to the sun and ring gears of a simple planetary gear set the planet carrier members of which gear set is connected to the transmission output shaft, and a brake for controlling the ring gear of the planetary gear set and one of the motor output shafts, comprising the steps of:
   a. engaging the brake to establish a gear reduction between one motor output shaft and the transmission output shaft and to hold the other motor stationary;
   b. increase the displacement of the pump from zero to maximum thereby driving the one motor;
   c. decreasing the displacement of the one motor from maximum until the displacement ratio of the motors is equal to the gear ratio between the sun and ring gears connected to their output shafts;
   d. releasing the brake and thereby the other motor shaft; and
   e. decreasing the displacement of both motors simultaneously while maintaining the ratio of the displacements as established in step (c) until a predetermined minimum displacement is established in the one motor.

* * * * *